US012055089B2

(12) United States Patent
Nakano et al.

(10) Patent No.: US 12,055,089 B2
(45) Date of Patent: Aug. 6, 2024

(54) WORK VEHICLE

(71) Applicant: KUBOTA CORPORATION, Osaka (JP)

(72) Inventors: Shota Nakano, Sakai (JP); Keiji Takahashi, Sakai (JP); Tsuyoshi Gono, Sakai (JP); Keita Ono, Sakai (JP); Norita Tottori, Sakai (JP); Naoya Okamoto, Sakai (JP); Ryosuke Tanaka, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 18/201,780

(22) Filed: May 25, 2023

(65) Prior Publication Data

US 2023/0392540 A1 Dec. 7, 2023

(30) Foreign Application Priority Data

Jun. 6, 2022 (JP) ................................ 2022-091477

(51) Int. Cl.
*F02N 19/04* (2010.01)
*F02B 3/06* (2006.01)
*F02P 19/02* (2006.01)

(52) U.S. Cl.
CPC ............. *F02B 3/06* (2013.01); *F02P 19/022* (2013.01)

(58) Field of Classification Search
CPC .... B66F 9/22; B66F 9/06; B66F 9/075; B66F 9/07504; B66F 19/00; B66F 9/12; F23Q 7/001; F23Q 2/285; F02M 31/00; F02M 31/02; F02M 31/04; F02P 19/022; F02P 19/02; F02P 19/00; F02P 19/025; F02P 19/026; F02B 3/06; F02N 11/08; F02N 11/0803; F02N 11/0811; F02N 11/0829; F02D 41/042; F02D 41/1494
See application file for complete search history.

(56) References Cited

U.S. PATENT DOCUMENTS 4,177,785 A * 12/1979 Sundeen ............... F02P 19/022 123/145 A
4,421,076 A * 12/1983 Sasaki .................. F02N 19/001 123/179.17

FOREIGN PATENT DOCUMENTS

| | | | | |
|---|---|---|---|---|
| DE | 102007014677 A1 | * | 10/2007 | F02P 19/021 |
| DE | 10262382 B3 | * | 12/2021 | B60H 1/02 |
| EP | 2672100 B1 | * | 12/2019 | F02M 31/13 |
| JP | 2005003500 A | * | 1/2005 | |
| JP | 3617572 B2 | | 2/2005 | |
| JP | 2007278802 A | * | 10/2007 | |

* cited by examiner

*Primary Examiner* — George C Jin
*Assistant Examiner* — Teuta B Holbrook
(74) *Attorney, Agent, or Firm* — Keating & Bennett, LLP

(57) ABSTRACT

A work vehicle includes a diesel engine, a heater to heat a gas to be supplied to a combustion chamber of the diesel engine, and a controller to execute an afterglow routine to cause the heater to operate. The controller is configured or programmed to execute the afterglow routine in response to the diesel engine being started, an elapse of a predetermined stop time since an end of a previous execution of the afterglow routine, and the work vehicle being in a warming-up state.

8 Claims, 7 Drawing Sheets

WORK VEHICLE

CROSS REFERENCE TO RELATED APPLICATIONS

This application claims the benefit of priority to Japanese Patent Application No. 2022-091477 filed on Jun. 6, 2022. The entire contents of this application are hereby incorporated herein by reference.

BACKGROUND OF THE INVENTION

1. Field of the Invention

The present invention relates to a work vehicle.

2. Description of the Related Art

Japanese Patent No. 3617572 discloses an intake preheating device for a diesel engine. This device performs pre-heating for pre-heating intake air before the diesel engine is started, and after-heating for pre-heating intake air after the diesel engine has been started. The after-heating ends when a predetermined time has elapsed, or when the cooling water temperature exceeds a set value.

Japanese Patent No. 3617572 is an example of the related art.

SUMMARY OF THE INVENTION

The inventors faced the problem of strong exhaust gas odors in a work vehicle in which a diesel engine is mounted. This problem was particularly noticeable in cold regions.

Preferred embodiments of the present invention provide work vehicles in which the generation of exhaust gas odor is reduced or prevented.

A work vehicle according to a preferred embodiment of the present invention includes a diesel engine, a heater to heat a gas to be supplied to a combustion chamber of the diesel engine, and a controller to execute an afterglow routine to cause the heater to operate, wherein the controller is configured or programmed to execute the afterglow routine in response to (i) the diesel engine being started, (ii) an elapse of a predetermined stop time since an end of previous execution of the afterglow routine, and (iii) the work vehicle being in a warming-up state.

As a result of intensive studies, the inventors have discovered that it is possible to reduce or prevent the generation of exhaust gas odor by executing the afterglow routine to cause the heater to operate, not only in response to the diesel engine being started, but also in response to an elapse of a predetermined stop time. According to the above-described feature, it is possible to realize a work vehicle in which the generation of exhaust gas odor is reduced or prevented.

In a preferred embodiment of the present invention, it is preferable that the work vehicle further includes a travel device, and a work device, wherein the controller is configured or programmed to determine that the work vehicle is in the warming-up state in response to (i) the travel device being stopped and (ii) the work device being stopped.

While the work vehicle does not travel and perform work, the temperature of the diesel engine decreases. In that case, exhaust gas odors may be generated. According to the above-described feature, the afterglow routine is executed in response to the travel device being stopped and the work device being stopped, and it is thus possible to effectively reduce or prevent exhaust gas odors.

In a preferred embodiment of the present invention, it is preferable that the work vehicle further includes a travel device, a work device, and a parking brake, wherein the controller is configured or programmed to determine that the work vehicle is in the warming-up state in response to (i) the travel device being stopped, (ii) the work device being stopped, and (iii) the parking brake being activated.

While the work vehicle does not travel and perform work, the temperature of the diesel engine decreases. In that case, exhaust gas odors may be generated. According to the above-described feature, the afterglow routine is executed in response to the travel device being stopped, the work device being stopped, and the parking brake being activated, and it is thus possible to effectively reduce or prevent exhaust gas odors.

In a preferred embodiment of the present invention, it is preferable that the controller is configured or programmed to count a number of executions of the afterglow routine, and does not execute the afterglow routine after the number of executions has reached a predetermined maximum number of executions.

According to the above-described feature, execution of the afterglow routine exceeding the maximum number of executions is prohibited, and therefore degradation and failure of the heater are reduced or prevented.

In a preferred embodiment of the present invention, it is preferable that the work vehicle further includes a starting switch, wherein the controller is configured or programmed to reset the number of executions to zero in response to the starting switch being turned off, and in response to the diesel engine being stopped without operation of the starting switch.

According to the above-described feature, even if the diesel engine is stopped without operation of the starting switch as in the case of so-called engine stall, the number of executions is reset to zero. Accordingly, the afterglow routine is executed after restarting the diesel engine until the maximum number of executions is reached, and it is thus possible to reliably reduce or prevent exhaust gas odors.

In a preferred embodiment of the present invention, it is preferable that the work vehicle further includes a work device, wherein the controller is configured or programmed to execute premature termination of the afterglow routine in response to a predetermined end condition being satisfied, and the predetermined end condition includes activation of the work device.

The temperature of the diesel engine increases when the work device is activated. Therefore, the necessity for the afterglow routine is reduced. According to the above-described feature, the premature termination of the afterglow routine is executed in response to the work device being activated, and therefore degradation and failure of the heater are reduced or prevented.

In a preferred embodiment of the present invention, it is preferable that the work device does not execute the premature termination before a time since the diesel engine was started exceeds a predetermined elapsed time.

The temperature of the diesel engine is relatively low after the start of the diesel engine, and therefore it is highly likely that an exhaust gas odor is generated. Therefore, it is preferable that the premature termination of the afterglow routine is not performed. According to the above-described feature, it is possible to effectively reduce or prevent exhaust gas odors.

In a preferred embodiment of the present invention, it is preferable that the afterglow routine includes a predetermined number of repetitions of (i) a first process of activating the heater, and (ii) a second process of setting the heater to a lower temperature than in the first process, and the first process is executed for a longer duration in a first execution than in a subsequent execution.

As a result of experiments, the inventors have discovered and confirmed that it is possible to reduce exhaust gas odor by making the duration of the first execution of the first process longer than the duration of a subsequent execution of the first process. According to the above-described feature, it is possible to further reduce or prevent exhaust gas odors.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

A tractor as an example of a work vehicle according to a preferred embodiment of the present invention will be described below with reference to the drawings.

Note that the present invention is not limited to the following preferred embodiments, and various modifications may be made without departing from the gist of the present invention.

Figure 1:
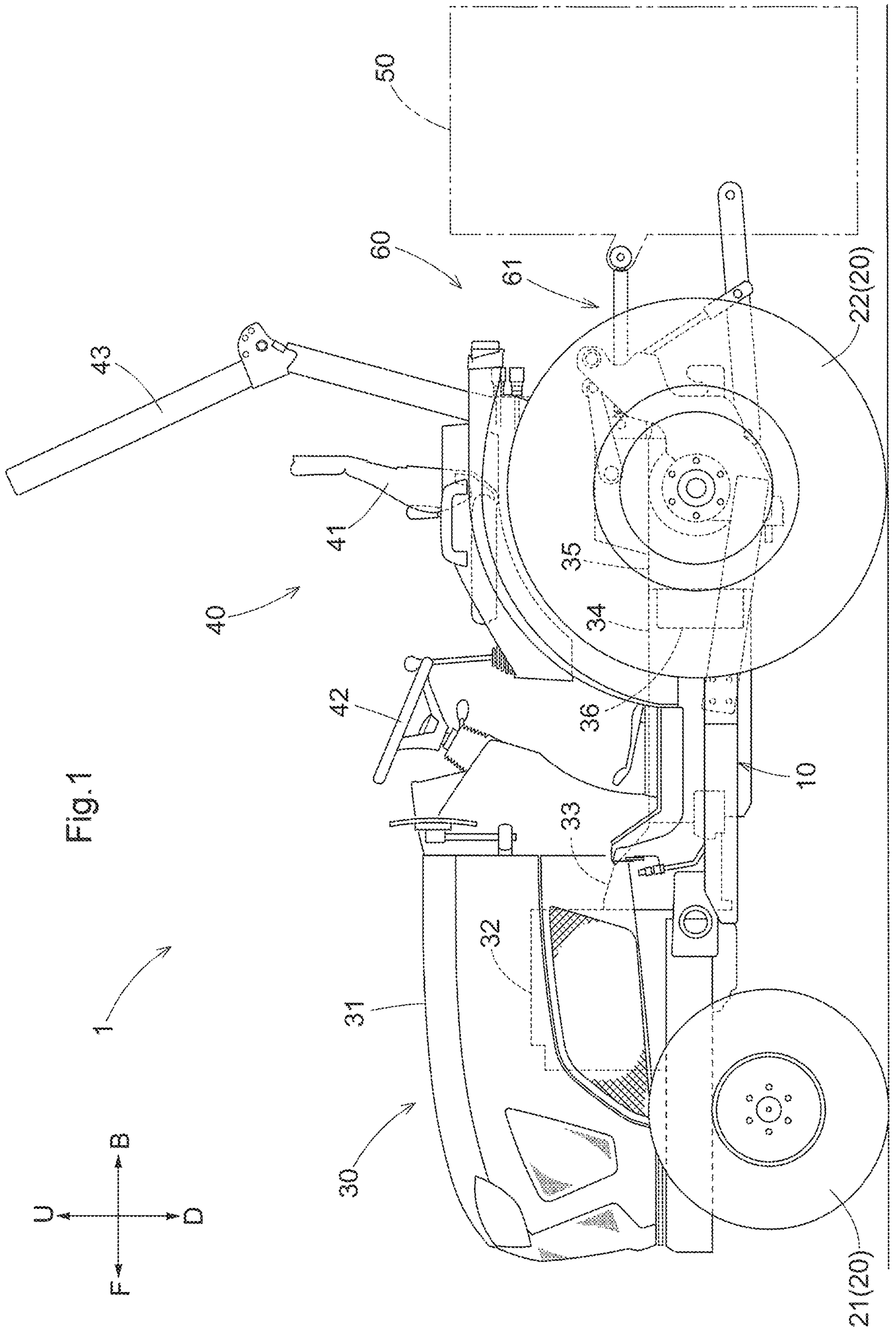
FIG. 1 is a side view of a tractor.

Unless otherwise described, the front-rear direction and the left-right direction in the present preferred embodiment are described as follows. The moving direction to a forward position when a tractor is working and traveling is defined as "front", which is indicated by the arrow F in FIG. 1. The moving direction to a backward position is defined as "rear", which is indicated by the arrow B in FIG. 1. In FIG. 1, the arrow U indicates "up", and the arrow D indicates "down".

As shown in FIG. 1, the travel vehicle body of a tractor 1 includes a body frame 10 that extends in the front-rear direction, a wheel-type travel device 20, a motive section 30, a driving section 40, and a connection section 60 to which a work device 50 can be connected.

The travel device 20 includes steerable and drivable left and right front wheels 21, and drivable left and right rear wheels 22.

The motive section 30 is supported by a front-side portion of the body frame 10. The motive section 30 includes a hood 31 and a diesel engine 32. The diesel engine 32 is located in an engine room defined by the hood 31.

A clutch housing 33 is coupled to a rear portion of the diesel engine 32. A transmission case 35 is connected to a rear portion of the clutch housing 33 via an intermediate frame 34. An HST 36 (hydrostatic continuously variable transmission) is coupled to a front portion of the transmission case 35.

The power of the diesel engine 32 is input to an input shaft of the HST 36 via a main clutch or the like provided inside the clutch housing 33. The power is transmitted from an output shaft of the HST 36 to a transmission provided in the transmission case 35. The power is transmitted from the transmission to the front wheels 21 and the rear wheels 22 of the travel device 20.

The power of the diesel engine 32 is also transmitted to the work device 50. The power from the HST 36 is transmitted to a working drive system provided inside the transmission case 35, and is supplied to the work device 50 via a PTO shaft (not shown).

Figure 3:
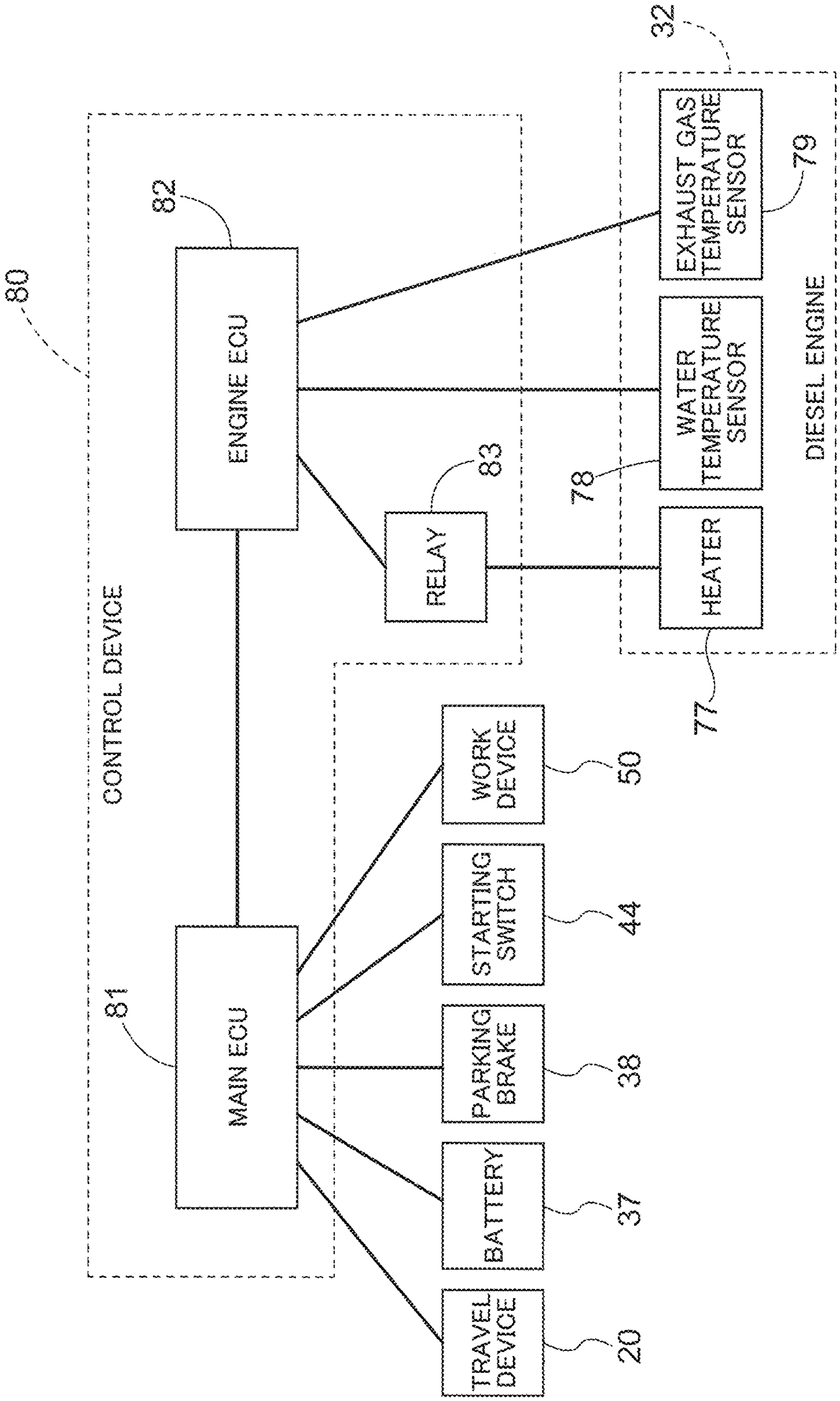
FIG. 3 is a diagram showing a configuration of a control device.

Note that the motive section 30 includes a battery 37 (FIG. 3) that supplies electric power to the diesel engine 32 and an electric/electronic system. The transmission provided inside the transmission case 35 includes a parking brake 38 (FIG. 3).

The driving section 40 is supported by a rear-side portion of the body frame 10. The driving section 40 includes a seat 41, a steering wheel 42, and a ROPS 43.

In addition, the driving section 40 includes a starting switch 44 (FIG. 3) that receives operations to start and stop the diesel engine 32. The starting switch 44 can be operated into off, on, and starting states.

The driving section 40 includes an operation tool (not shown) that receives a manual operation performed on the travel device 20, the parking brake 38, the work device 50, and so forth. Examples of the operation tool include a main transmission lever, a sub-transmission lever, a parking brake pedal, and a PTO switch.

The work device 50 may be a rotary cultivator device or an agricultural chemical sprayer device, for example.

The connection section 60 is configured to support the work device 50 and to enable the work device 50 to be connected to the travel vehicle body. In the present preferred embodiment, the connection section 60 includes a link mechanism 61 that raises and lowers the work device 50.

Figure 2:
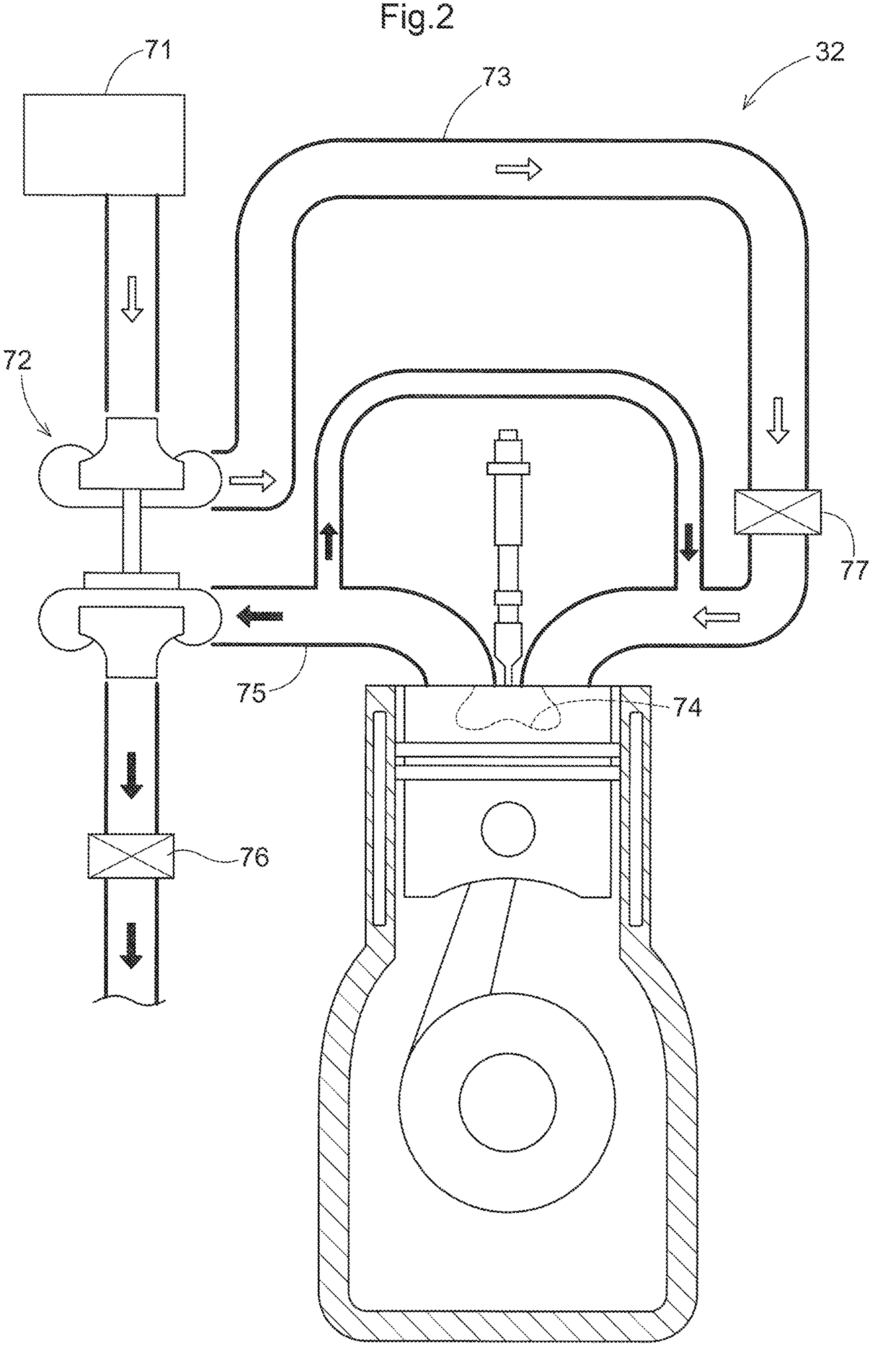
FIG. 2 is a diagram showing a configuration of a diesel engine.

FIG. 2 shows a schematic configuration of the diesel engine 32. The diesel engine 32 includes an air cleaner 71, a turbocharger 72, an intake passage 73, a combustion chamber 74, an exhaust passage 75, a DPF 76, a heater 77, and so forth.

Air taken in through the air cleaner 71 is compressed in the turbocharger 72, and fed to the combustion chamber 74 through the intake passage 73. Exhaust gas generated in the combustion chamber 74 passes through the exhaust passage 75, drives the turbocharger 72, is cleaned through the DPF 76, and discharged.

The heater 77 is provided on the intake passage 73. The heater 77 heats a gas (air) that is supplied to the combustion chamber 74 of the diesel engine 32. For example, the heater 77 is an element that generates heat when energized.

As shown in FIG. 3, the diesel engine 32 includes a water temperature sensor 78 that detects the temperature of cooling water, and an exhaust gas temperature sensor 79 that detects the temperature of exhaust gas.

The tractor 1 includes a control device 80. As shown in FIG. 3, the control device 80 in the present preferred embodiment includes a main ECU 81, an engine ECU 82, and a relay 83.

The main ECU 81 and the engine ECU 82 each include a memory such as an HDD or a nonvolatile RAM, and a CPU (both not shown). The control of the tractor 1 described below is realized by the CPU executing a program stored in the memory.

The relay 83 allows power to be supplied to the heater 77 of the diesel engine 32, and cuts off power thereto under control by the engine ECU 82.

The main ECU 81 is configured or programmed to detect a state of the travel device 20. For example, the main ECU 81 is capable of detecting whether the HST 36 is neutral, or whether the transmission is neutral. The state of the travel device 20 may be detected based on an output of a sensor provided in a control system or an operation system of the HST 36 or another transmission.

The main ECU 81 is configured or programmed to detect a state of the battery 37. For example, the main ECU 81 is capable of detecting the voltage of the battery 37.

The main ECU 81 is configured or programmed to detect a state of the parking brake 38. For example, the main ECU 81 is capable of detecting whether the parking brake 38 is activated. The state of the parking brake 38 may be detected based on an output of a sensor provided in a control system or an operation system of the parking brake 38.

The main ECU 81 is configured or programmed to detect a state of the starting switch 44. For example, the main ECU 81 is capable of detecting the operational state (off, on, starting) of the starting switch 44.

The main ECU 81 is configured or programmed to detect a state of the work device 50. For example, the main ECU 81 is capable of detecting whether the PTO shaft is driven (i.e., whether the work device 50 is activated). The state of the work device 50 may be detected based on an output of a sensor provided in a control system or an operation system of the work device 50.

The memory of the main ECU 81 stores a temporary parameter and a constant parameter. The memory of the main ECU 81 stores the number of executions of an afterglow routine described below.

The engine ECU 82 is configured or programmed to detect the cooling water temperature of the diesel engine 32, based on an output of the water temperature sensor 78.

The engine ECU 82 is configured or programmed to detect the exhaust gas temperature of the diesel engine 32, based on an output of the exhaust gas temperature sensor 79.

The engine ECU 82 is configured or programmed to detect other states (the number of revolutions, etc.) of the diesel engine 32.

The main ECU 81 and the engine ECU 82 are communicably connected to each other via a vehicle-mounted network such as a CAN.

The control device 80 is configured or programmed to execute an afterglow routine. The afterglow routine causes the heater 77 to operate.

Figure 4:
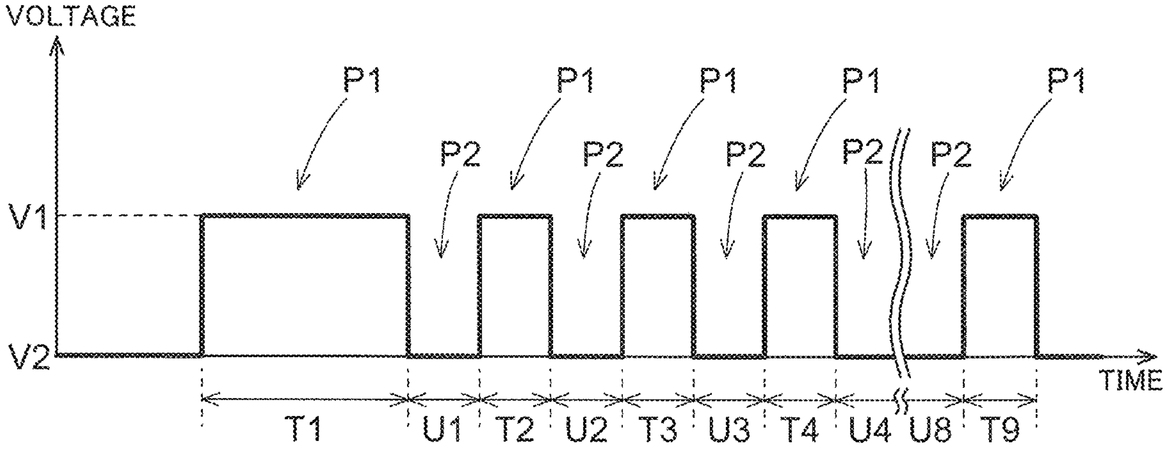
FIG. 4 is a graph showing an example of an afterglow routine.

FIG. 4 shows an example of the afterglow routine. The illustrated afterglow routine includes a predetermined number of repetitions of (i) a first process P1 of activating the heater 77, and (ii) a second process P2 of setting the heater 77 to a lower temperature than in the first process P1. In the illustrated example, nine executions of the first process P1 and eight executions of the second process P2 are repeated, with each execution of the second process P2 between two executions of the first process P1.

In the first process P1, the voltage applied to the heater 77 is a voltage V1. In the second process P2, the voltage applied to the heater 77 is a voltage V2. The control device 80 is configured or programmed to make the absolute value of the voltage V2 smaller than the absolute value of the voltage V1. Accordingly, the temperature of the heater 77 in the second process P2 is lower than the temperature of the heater 77 in the first process P1.

In the present preferred embodiment, the voltage V2 is zero, and the voltage V1 is a positive voltage that is not zero. In the present preferred embodiment, the first process P1 is realized as a result of the relay 83 allowing power to be supplied to the heater 77. The second process P2 is realized as a result of the relay 83 cutting off power to the heater 77.

In FIG. 4, the durations of the first process P1 are indicated by T1, T2 . . . T9. The durations of the second process P2 are indicated by U1, U2 . . . U8. In the illustrated example, the duration T1 of the first execution of the first process P1 is longer than the durations T2, T3 . . . T9 of the other executions of the first process P1. In the illustrated example, the durations T2, T3 . . . T9 are the same. The durations U1, U2 . . . U8 are the same.

As described below, the mode of the afterglow routine may differ from that of the example shown in FIG. 4.

The control device 80 may be configured or programmed to make the voltage V1 and the voltage V2 variable.

The voltage V1 and the voltage V2 may change in the middle of the afterglow routine. For example, the voltage V1 of the first execution of the first process P1 may differ from the voltage V1 of the second execution of the first process P1.

The durations T1, . . . T9 may be the same. The durations T2, T3 . . . T9 may differ from each other. The durations U1, U2 . . . U8 may differ from each other.

The modes (voltage and/or duration) of the afterglow routine that are executed a plurality of times may be all the same, or differ from each other.

When the afterglow routine is executed, the control device 80 operates as follows. The main ECU 81 transmits a heater relay request signal representing an output request to the engine ECU 82. Upon receiving the heater relay request signal representing an output request, the engine ECU 82 controls the relay 83 to allow power to be supplied to the heater 77. When the duration T1 has elapsed, the main ECU 81 transmits a heater relay request signal representing a stop request to the engine ECU 82. Upon receiving the heater relay request signal representing a stop request, the engine ECU 82 controls the relay 83 to cut off power to the heater 77.

Figure 5:
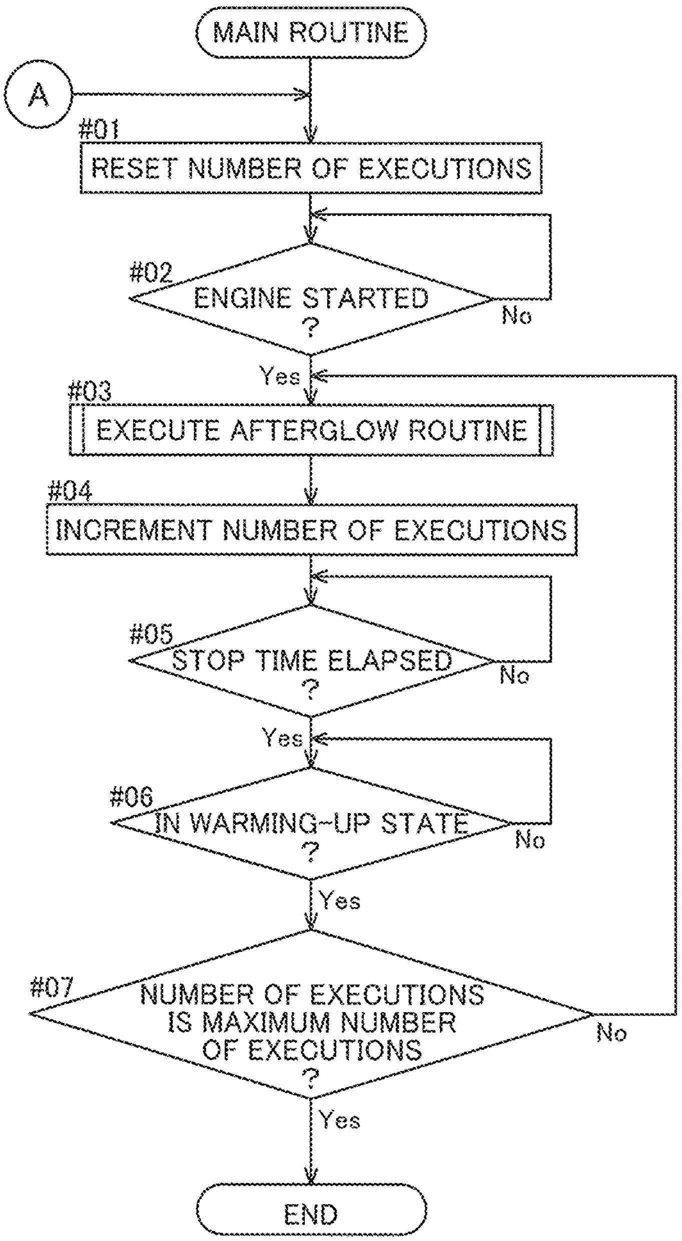
FIG. 5 is a flowchart illustrating a main routine.

Processing for starting the afterglow routine (hereinafter referred to as a "main routine") will be described with reference to the flowchart shown in FIG. 5. This processing starts when the starting switch 44 is operated to be turned on. The control device 80 resets the number of executions of the afterglow routine to zero (step #01).

The control device 80 determines whether the diesel engine 32 is started (step #02). The processing of step #02 is repeated until it is determined that the diesel engine 32 is started (step #02: No).

Whether the diesel engine 32 is started is determined, for example, based on the number of revolutions of the diesel engine 32, or on whether the battery 37 is being charged.

If it is determined that the diesel engine 32 is started (step #02: Yes), the afterglow routine is executed (step #03). The processing during execution of the afterglow routine will be described later with reference to FIG. 6.

When the afterglow routine ends, the control device 80 increments the number of executions of the afterglow routine (step #04). That is, the number of executions is incremented by 1. In the present preferred embodiment, the number of executions is incremented not only if the afterglow routine is normally terminated, but also if the afterglow routine is prematurely terminated. Note that the control device 80 may be configured or programmed to not to increment the number of executions if the afterglow routine is prematurely terminated.

The control device 80 waits for a predetermined stop time to elapse after the afterglow routine has ended (step #05: No). Specifically, the control device 80 measures an elapsed time since the afterglow routine ended, compares the measured elapsed time with a predetermined stop time, and waits for the elapsed time to exceed the stop time. The stop time is 50 minutes, for example.

When the stop time has elapsed (step #05: Yes), the control device 80 determines whether the tractor 1 is in a warming-up state (step #06). The processing of step #06 is repeated until it is determined that the tractor 1 is in the warming-up state (step #06: No).

In the present preferred embodiment, the control device 80 determines that the tractor 1 is in the warming-up state if a state in which the following conditions (warming-up state conditions) are all satisfied has continued for a predetermined time (e.g., about 10 minutes).

Warming-up state condition 1 is that the travel device 20 is stopped. The control device 80 determines whether the travel device 20 is stopped, based on the detected state of the travel device 20. For example, the control device 80 determines that the warming-up state condition 1 is satisfied if both the HST 36 and the transmission are neutral. The control device 80 may be configured or programmed to determine that the warming-up state condition 1 is satisfied if one of the HST 36 and the transmission is neutral.

Warming-up state condition 2 is that the work device 50 is stopped. The control device 80 determines whether the work device 50 is stopped, based on the detected state of the work device 50.

Warming-up state condition 3 is that the parking brake 38 is activated (locked state). The control device 80 determines whether the parking brake 38 is activated, based on the detected state of the parking brake 38.

That is, the control device 80 determines that the tractor 1 is in the warming-up state if the travel device 20 is stopped, the work device 50 is stopped, and the parking brake 38 is activated.

The control device 80 may be configured or programmed to determine that the tractor 1 is in the warming-up state if a portion of the warming-up state conditions is satisfied. For example, the control device 80 may be configured or programmed to determine that the tractor 1 is in the warming-up state if the travel device 20 is stopped and the work device 50 is stopped.

If it is determined that the tractor 1 is in the warming-up state (step #06: Yes), the control device 80 determines whether the number of executions of the afterglow routine is a predetermined maximum number of executions (step #07). The maximum number of executions is set to 3, for example.

If the number of executions of the afterglow routine has not reached the predetermined maximum number of executions (step #07: No), the afterglow routine is executed (step #03), and the processing operations from step #04 and onward are executed.

If the number of executions of the afterglow routine has reached the predetermined maximum number of executions (step #07: Yes), the control device 80 ends the main routine. That is, the control device 80 counts the number of executions of the afterglow routine, and does not execute the afterglow routine after the number of executions has reached the predetermined maximum number of executions.

Figure 6:
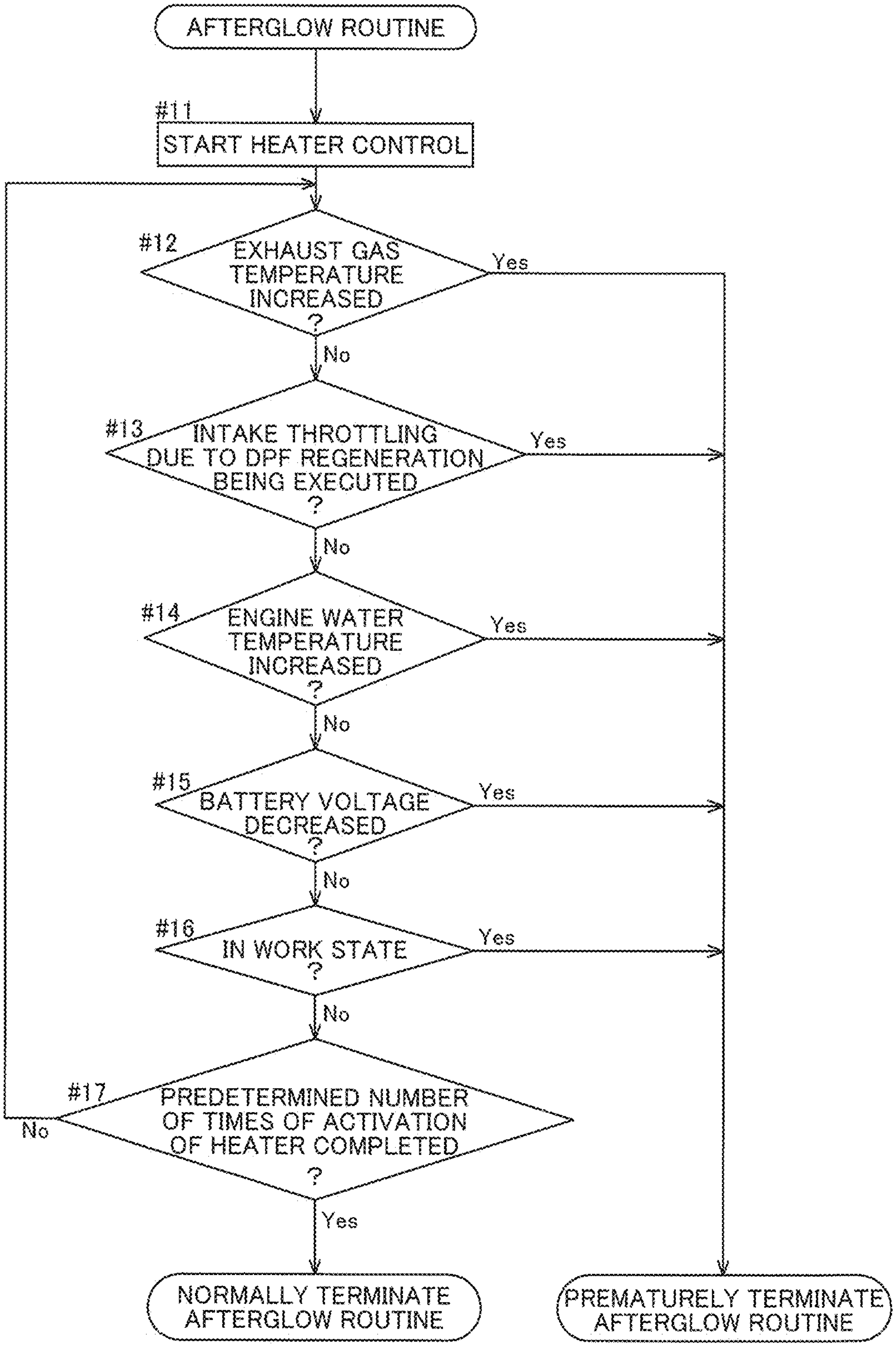
FIG. 6 is a flowchart illustrating an afterglow routine.

The processing performed in the afterglow routine will be described with reference to the flowchart of FIG. 6.

The control device 80 starts control of the heater 77 (step #11). Specifically, the control device 80 starts operation of the heater 77 (energization of the heater 77). In the present preferred embodiment, the control device 80 causes the heater 77 to operate in the mode shown in FIG. 4.

The processing operations from step #12 to step #16 are repeatedly executed during a period from when control of the heater 77 has been started (step #11) until when a predetermined number of operations of the heater are completed (step #17: No).

In the processing operations from step #12 to step #16, whether an end condition is satisfied is determined, and if the end condition is satisfied (steps #12 to 16: Yes), the control device 80 prematurely terminates the afterglow routine. If the end condition is not satisfied (steps #12 to 16: No), the processing operations are repeated until the predetermined number of operations of the heater are completed (step #17: No).

The control device 80 determines whether the exhaust gas temperature of the diesel engine 32 has increased over a predetermined threshold temperature (step #12). Specifically, the control device 80 compares an output of the exhaust gas temperature sensor 79 with the threshold temperature (e.g., about 230° C.), and makes a "Yes" determination if a state in which the output exceeds the threshold temperature continues for a predetermined time (e.g., about 10 seconds) or longer.

The control device 80 determines whether intake throttling due to DPF regeneration is being performed (step #13). Intake throttling is performed by the engine ECU 82 if a state in which the cooling water temperature of the diesel engine 32 exceeds a predetermined threshold (e.g., about 55° C.) continues for a predetermined time or longer during DPF regeneration.

The control device 80 determines whether the cooling water temperature of the diesel engine 32 has increased over a predetermined threshold temperature (step #14). Specifically, the control device 80 compares an output of the water temperature sensor 78 with a threshold temperature (e.g., about 90° C.), and makes a "Yes" determination if a state in which the output exceeds the threshold temperature continues for a predetermined time (e.g., 3 seconds) or longer.

The control device 80 determines whether the voltage of the battery 37 has decreased below a predetermined threshold voltage (step #15). Specifically, the control device 80 compares the voltage of the battery 37 and the threshold voltage (e.g., about 10.0 V), and makes a "Yes" determination if a state in which the voltage is below the threshold voltage continues for a predetermined time (e.g., about 5 seconds) or longer.

The control device 80 determines whether the tractor 1 is in a work state (step #16). In the present preferred embodiment, the control device 80 determines that the tractor 1 is in the work state if a state in which the following conditions (work state conditions) are all satisfied continues for a predetermined time (e.g., about 1 minute).

Work state condition 1 is that the travel device 20 is activated. The control device 80 determines whether the travel device 20 is activated, based on the detected state of the travel device 20. For example, the control device 80 determines that the work state condition 1 is satisfied if neither the HST 36 nor the transmission is neutral. The control device 80 may be configured or programmed to determine that the work state condition 1 is satisfied if one of the HST 36 and the transmission is not neutral.

Work state condition 2 is that the work device 50 is activated. The control device 80 determines whether the work device 50 is activated, based on the detected state of the work device 50.

Work state condition 3 is that the parking brake 38 is released (unlocked state). The control device 80 determines whether the parking brake 38 is released, based on the detected state of the parking brake 38.

The control device 80 may be configured or programmed to determine that the tractor 1 is in the work state if a portion of the work state conditions is satisfied.

When a predetermined number (nine in the example shown in FIG. 4) of operations of the heater is completed (step #17: Yes), the control device 80 normally terminates the afterglow routine.

Figure 7:
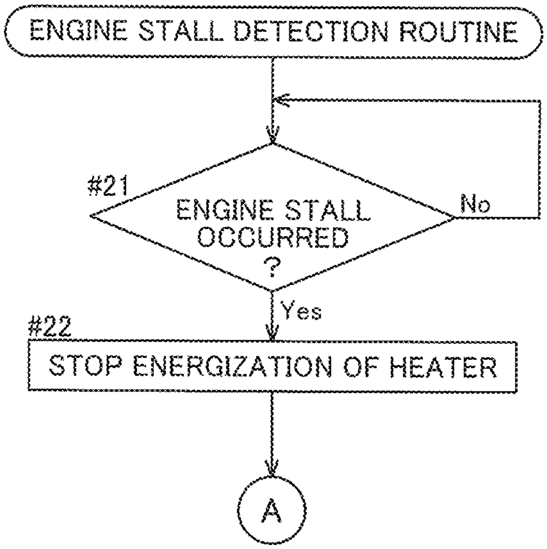
FIG. 7 is a flowchart illustrating an engine stall detection routine.

An engine stall detection routine will be described with reference to the flowchart of FIG. 7. The engine stall detection routine is started after the diesel engine 32 has been started (step #02 of the main routine).

The control device 80 continuously determines whether engine stall (stop) has occurred in the diesel engine 32 (step #21: No). Specifically, the control device 80 determines whether engine stall has occurred, based on the detected number of revolutions of the diesel engine 32.

If it is determined that engine stall has occurred (step #21: Yes), the control device 80 stops energization of the heater 77 (step #22). Then, the control device 80 proceeds to A of the main routine (FIG. 5), and executes step #01.

As described above, the control device 80 executes the afterglow routine (step #03) in response to the diesel engine 32 being started (step #02: Yes), an elapse of the predetermined stop time since an end of the previous execution of the afterglow routine (step #05: Yes), and the tractor 1 being in the warming-up state (step #06: Yes).

When the starting switch 44 is turned off, and thereafter the starting switch 44 is turned on, the main routine (FIG. 5) is started, and the number of executions of the afterglow routine is reset to zero (step #03). If engine stall has occurred (step #21: Yes), the number of executions of the afterglow routine is also reset to zero (step #03). That is, the control device 80 resets the number of executions of the afterglow routine to zero in response to the starting switch 44 being turned off, and in response to the diesel engine 32 being stopped without operation of the starting switch 44.

The control device 80 is configured or programmed to perform premature termination of the afterglow routine in response to a predetermined end condition being satisfied (steps #12 to 16: Yes), and the end condition includes activation of the work device (step #16: Yes).

Other Preferred Embodiments

In the above-described preferred embodiments, the tractor 1 preferably is a cabless tractor, which includes no cabin. The tractor 1 may include a cabin that covers the driving section 40.

The driving of the work device 50 may be achieved by another power source. For example, hydraulic fluid from a hydraulic pump that is driven by the diesel engine 32 may drive the work device 50.

The control device 80 may be configured or programmed to not to perform the premature termination of the afterglow routine before the time since the diesel engine 32 was started exceeds a predetermined elapsed time. Since the temperature of the diesel engine 32 is relatively low after the start of the diesel engine 32, it is highly likely that exhaust gas odor is generated. Therefore, it is preferable that the premature termination of the afterglow routine is not performed. According to this preferred embodiment, it is possible to effectively reduce or prevent exhaust gas odor.

Preferred embodiments of the present invention are applicable to work vehicles including a diesel engine. For example, preferred embodiments of the present invention are applicable to agricultural machines including a tractor, as well as a harvester such as a normal-type combine and a self-threshing combine, a rice planter, a transplanter, and a power tiller, and construction machines.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A work vehicle comprising:

a diesel engine;

a heater to heat a gas to be supplied to a combustion chamber of the diesel engine;

a controller to execute an afterglow routine to cause the heater to operate; and a work device; wherein the controller is configured or programmed to execute the afterglow routine in response to (i) the diesel engine being started, (ii) an elapse of a predetermined stop time since an end of previous execution of the afterglow routine, and (iii) the work vehicle being in a warming-up state; and the controller is configured or programmed to determine that the work vehicle is in the warming-up state in response to the work device being stopped.

2. The work vehicle according to claim 1, further comprising:

a travel device; wherein the controller is configured or programmed to determine that the work vehicle is in the warming-up state in response to (i) the travel device being stopped and (ii) the work device being stopped.

3. The work vehicle according to claim 1, wherein the controller is configured or programmed to count a number of executions of the afterglow routine, and does not execute the afterglow routine after the number of executions has reached a predetermined maximum number of executions.

4. The work vehicle according to claim 3, further comprising:

a starting switch; wherein the controller is configured or programmed to reset the number of executions to zero in response to the starting switch being turned off, and in response to the diesel engine being stopped without operation of the starting switch.

5. The work vehicle according to claim 1, wherein the afterglow routine includes a predetermined number of repetitions of (i) a first process of activating the heater, and (ii) a second process of setting the heater to a lower temperature than in the first process; and the first process is executed for a longer duration in a first execution than in a subsequent execution.

6. A work vehicle comprising:

a diesel engine;

a heater to heat a gas to be supplied to a combustion chamber of the diesel engine;

a controller to execute an afterglow routine to cause the heater to operate;

a travel device;

a work device; and a parking brake; wherein the controller is configured or programmed to execute the afterglow routine in response to (i) the diesel engine being started, (ii) an elapse of a predetermined stop time since an end of previous execution of the afterglow routine, and (iii) the work vehicle being in a warming-up state; and the controller is configured or programmed to determine that the work vehicle is in the warming-up state in response to (i) the travel device being stopped, (ii) the work device being stopped, and (iii) the parking brake being activated.

7. A work vehicle comprising:

a diesel engine;

a heater to heat a gas to be supplied to a combustion chamber of the diesel engine;

a controller to execute an afterglow routine to cause the heater to operate; and a work device; wherein the controller is configured or programmed to execute the afterglow routine in response to (i) the diesel engine being started, (ii) an elapse of a predetermined stop time since an end of previous execution of the afterglow routine, and (iii) the work vehicle being in a warming-up state;

the controller is configured or programmed to execute a premature termination of the afterglow routine in response to a predetermined end condition being satisfied; and the end condition includes an activation of the work device.

8. The work vehicle according to claim 7, wherein the work device does not execute the premature termination before a time since the diesel engine was started exceeds a predetermined elapsed time.

* * * * *